(No Model.)
D. VON REIBNITZ.
MEAT SCRAPER.
No. 421,995. Patented Feb. 25, 1890.
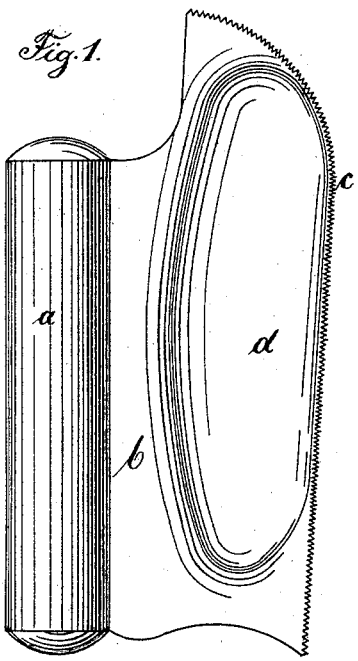
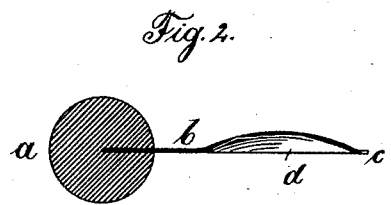
Witnesses:
August C. Christen
Rudolph Stuler
Inventor:
Diprand von Reibnitz
per Charles Raettig
his Atty.

UNITED STATES PATENT OFFICE.

DIPRAND VON REIBNITZ, OF BERLIN, GERMANY.

MEAT-SCRAPER.

SPECIFICATION forming part of Letters Patent No. 421,995, dated February 25, 1890.

Application filed November 14, 1889. Serial No. 330,366. (No model.) Patented in Switzerland October 17, 1889, No. 1,421.

*To all whom it may concern:*

Be it known that I, DIPRAND VON REIBNITZ, a subject of the King of Prussia and Emperor of Germany, and a resident of the city of Berlin, in the Kingdom of Prussia, Germany, have invented certain new and useful Improvements in Meat-Scrapers, (for which a patent has been granted to me in Switzerland, No. 1,421, dated October 17, 1889,) of which the following is a specification.

This invention relates to meat-scrapers by the aid of which fine particles of meat are separated from the intergrowing sinews; and the object of my invention is to provide a tool by the aid of which this separation can be done uniformly and expeditiously.

In the accompanying drawings, Figure 1 is a side elevation, and Fig. 2 a transverse section, of the meat-scraper.

Similar letters of reference designate corresponding parts in all the figures.

My invention consists in a meat-scraper having a broad blade $b$, of steel or other suitable material, preferably in the shape of a battle-ax, provided with fine and sharp obliquely-tapering saw-teeth $c$ along its outer edge, as shown, and with a cavity or trough $d$ at one side of the blade. This blade is secured to a handle $a$, of any suitable shape or material. To use this tool, the meat to be scraped is placed on a table and pressed at one end upon it by the hand of the operator, while the other hand draws the tool, with the teeth pressing into the the meat, gently over its upper surface in a direction parallel with that of the grain of the sinews and away from the hand holding the meat to the table. The scraper during this operation is held at an acute angle to the direction of the scraping motion and with the trough $d$ facing downward. The fine particles of the meat separated by the teeth will hereby collect in the cavity $d$, while the sinews are freely passing through the spaces between the teeth, and in continuing the operation will be freed entirely from the surrounding meat, leaving them cleaner than when scraped with the ordinary smooth-edged scraping-knife, or with similar contrivances.

Having described my invention, what I claim, and desire to secure by Letters Patent, is—

A meat-scraper provided with a blade having a serrated scraping-edge and a trough-shaped cavity formed therein by concaving the metal of the blade for the reception of the scraped meat, all substantially as and for the purpose set forth.

Signed at Berlin, in the Kingdom of Prussia, this 31st day of October, A. D. 1889.

DIPRAND VON REIBNITZ.

Witnesses:
 HUGO KNOBLAUCH,
 OSWALD SCHMIDT.